(12) United States Patent
Begin et al.

(10) Patent No.: US 11,286,120 B2
(45) Date of Patent: Mar. 29, 2022

(54) POSITIONING OF PRODUCTS WHILE AT THE SAME TIME CONVEYING SAME

(71) Applicant: SIDEL PACKING SOLUTIONS, Corcelles-les-Citeaux (FR)

(72) Inventors: Michel Begin, Corcelles-les-Citeaux (FR); Guillaume Duchemin, Corcelles-les-Citeaux (FR); Benoît Poutot, Corcelles-les-Citeaux (FR); Rémy Dufraigne, Corcelles-les-Citeaux (FR)

(73) Assignee: SIDEL PACKING SOLUTIONS, Corcelles-les-Citeaux (FR)

( * ) Notice: Subject to any disclaimer, the term of this patent is extended or adjusted under 35 U.S.C. 154(b) by 0 days.

(21) Appl. No.: 16/606,505

(22) PCT Filed: Apr. 19, 2018

(86) PCT No.: PCT/FR2018/050987
§ 371 (c)(1),
(2) Date: Oct. 18, 2019

(87) PCT Pub. No.: WO2018/193218
PCT Pub. Date: Oct. 25, 2018

(65) Prior Publication Data
US 2021/0114818 A1    Apr. 22, 2021

(30) Foreign Application Priority Data

Apr. 19, 2017  (FR) ........................................ 1753383

(51) Int. Cl.
*B65G 47/244*   (2006.01)
*B65G 47/84*    (2006.01)
*B65G 54/02*    (2006.01)

(52) U.S. Cl.
CPC ......... *B65G 47/244* (2013.01); *B65G 47/845* (2013.01); *B65G 54/02* (2013.01); *B65G 2201/0244* (2013.01)

(58) Field of Classification Search
CPC .... B65G 47/24; B65G 47/244; B65G 47/845; B65G 54/02; B65G 2203/042; B65G 2201/0244
(Continued)

(56) References Cited

U.S. PATENT DOCUMENTS

| 3,471,012 A | 10/1969 | Calhoun |
| 2008/0245031 A1* | 10/2008 | Salvoni .................. B65G 47/31 53/299 |

(Continued)

FOREIGN PATENT DOCUMENTS

| DE | 2402972 A1 | 7/1975 |
| DE | 102014226965 A1 | 6/2016 |

(Continued)

OTHER PUBLICATIONS

International Search Report dated Jun. 13, 2018 for PCT/FR2018/050987.

*Primary Examiner* — James R Bidwell

(57) ABSTRACT

The subject of the invention is a positioning device for positioning products while at the same time conveying products one after another on a conveyor in a conveying plane and along a conveying direction. This device comprising a plurality of orientation devices each comprising at least one pusher mounted with the ability to move on a guide, said guide being situated on the side of the conveyor and defining a closed circulation loop at least a portion of which lies along the conveying direction, the at least one pusher being able to act on a product by pushing it in order to cause it to pivot through a predetermined angle about an axis perpendicular to the conveying plane, said orientation (Continued)

devices being capable of moving independently of one another on said guide. The invention also relates to a corresponding method.

20 Claims, 5 Drawing Sheets

(58) Field of Classification Search
USPC .................................................. 198/400, 401
See application file for complete search history.

(56) References Cited

U.S. PATENT DOCUMENTS

| 2015/0266676 A1* | 9/2015 | Begin ................... B65G 47/244 |
| | | 198/376 |
| 2017/0233197 A1* | 8/2017 | Keller .................... B65G 47/82 |
| | | 198/401 |
| 2017/0343483 A1 | 11/2017 | Piana et al. |
| 2018/0305138 A1* | 10/2018 | Wittmann ............. B65B 59/005 |

FOREIGN PATENT DOCUMENTS

| EP | 1020380 A1 | 7/2000 |
| EP | 1801014 A1 | 6/2007 |
| EP | 2743192 A1 | 6/2014 |
| GB | 147475 A | 9/1977 |
| WO | 0119679 A1 | 3/2001 |

* cited by examiner

POSITIONING OF PRODUCTS WHILE AT THE SAME TIME CONVEYING SAME

FIELD OF INVENTION

The present invention relates to the general field of conveying products and in particular has for subject matter a particular device and a particular method of using it that enable positioning of the products, that is to say at least modifying the orientation of same perpendicular to the conveying plane.

BACKGROUND OF THE INVENTION

Some products of small bottle type have flattened faces on their lateral wall, in particular for placing there a label giving information on their content. Small bottles, or products, of this kind therefore have a principal axis that is vertical when the products are positioned upright on a supporting plane. They may also have a section of oblong shape in the conveying plane.

Depending on how these products are positioned, it is therefore possible, or not, to read said information that is found on their flat faces. Their orientation on the shelves is therefore important for retailers and consumers. The orientation of the products once boxed is also an important factor for optimizing the volume of said boxes.

There are known installations for producing merchandisers of products of this kind in which the products are lined up one behind the other, forming one or more rows.

For the products all to be correctly oriented, devices for orienting the products have been employed in the installations to turn the products about an axis perpendicular to the conveying plane, namely a vertical axis.

Thus the document FR 2 285 303 describes an installation equipped with a device for orienting the products. The installation includes an endless conveyor on which said products are lined up one behind the other, the endless conveyor having a product feeding direction and a product feeding sense. The installation is equipped in particular with a lead screw for spacing the products and imparting a given orientation. The orientation that the products assume in the screw may conform or not to the required orientation. There is also provided downstream of the lead screw an orientation device that pivots the product 180 degrees. An installation of this kind has certain disadvantages, of which the following may be cited:

- the screw used to orient the products and to space them has dimensions adapted to the products. Also, when the types of products treated change shapes or dimensions it is necessary to change the screws. Now, a change of screw necessitates immobilization of the installation, which compromises the overall productivity of the installation. In some applications it may be necessary to propose an alternative solution to screws;
- moreover, it is necessary to provide a storage zone in the vicinity of the installation for storing the lead screws adapted to the different products to be oriented. The overall installation may therefore prove excessively bulky;
- the installation including a plurality of screws may prove costly, because it is necessary to provide a plurality of different screws;
- rubbing between the product and the screw can generate unsightly macro or micro scratches;
- finally, static orientation downstream of a screw risks destabilizing or marking the products and because of this prevents operation with a high throughput.

The document FR 3 018 789 describes an installation proposing an alternative to using lead screws. The products are oriented by manipulating each product separately, using an actuator dedicated to said product and moving transversely to the conveying direction. The orientation being effected while the products are being transported by a conveyor, the actuators are also mobile along the conveying direction so as to be able to accompany the products while they orient them. The mobility of the actuators along the conveying direction is obtained by virtue of the fact that they are mounted on slides that extend alongside the conveyor.

With increasing productivity being a constant concern, there exists a need to improve on what exists already, in particular by providing a system enabling operation with higher throughputs.

SUMMARY OF THE INVENTION

To this end, the invention proposes to orient each product using an actuator mounted on at least one guide means that forms a circulation loop, at least a portion of that guide means extending along the conveying means that transports the products. In the guide portion that extends along the conveying means the actuators can therefore be positioned at the height of the products and cause them to pivot whilst accompanying them in their movement along the conveying direction. Once this action has been completed, instead of extending again along the conveying means in the opposite direction to return for new products, the actuators continue their circulation along a return run of the loop formed by the guiding means until they rejoin the portion of the guide means that is located along the conveying means to orient new products.

In other words, the invention proposes a device in which the actuators, instead of reciprocating along the conveying direction advantageously travel continuously around a closed loop. Some actuators can therefore be active, that is to say cause products to pivot, while others are in the process of returning upstream in the conveying direction after having caused products to pivot in order to be able to cause others to pivot.

The invention therefore consists in a positioning device for positioning products while at the same time conveying them one after another on a conveying means in a conveying plane and along a conveying direction.

This device is characterized in that it comprises a plurality of orientation means each comprising at last one pusher mounted with the ability to move on a guide means, said guide means being situated on the side of the conveying means and defining a closed circulation loop at least a portion of which lies along the conveying direction, the at least one pusher being able to act on a product by pushing it in order to cause it to pivot through a predetermined angle about an axis perpendicular to the conveying plane, said orientation means being capable of moving independently of one another on said guide means.

The invention also consists in a method executed by this device, namely a method for positioning products while at the same time conveying them one after another on a conveying means in a conveying plane and along a conveying direction.

This method is characterized in that positioning each product comprises the following successive steps:

(i) defining the position of the product on said conveying means;
(ii) positioning in a corresponding manner in the conveying direction an orientation means that travels on at least one guide means that defines a closed circulation loop on the side of the conveying means; and
(iii) orienting the product by moving at least one pusher of the orientation means to cause it to pivot through a predetermined angle around an axis perpendicular to the conveying plane.

BRIEF DESCRIPTION OF THE DRAWINGS

The invention will be better understood thanks to the following description based on possible embodiments explained in a nonlimiting and illustrative manner with reference to the appended figures, in which.

DETAILED DESCRIPTION

Figure 1:
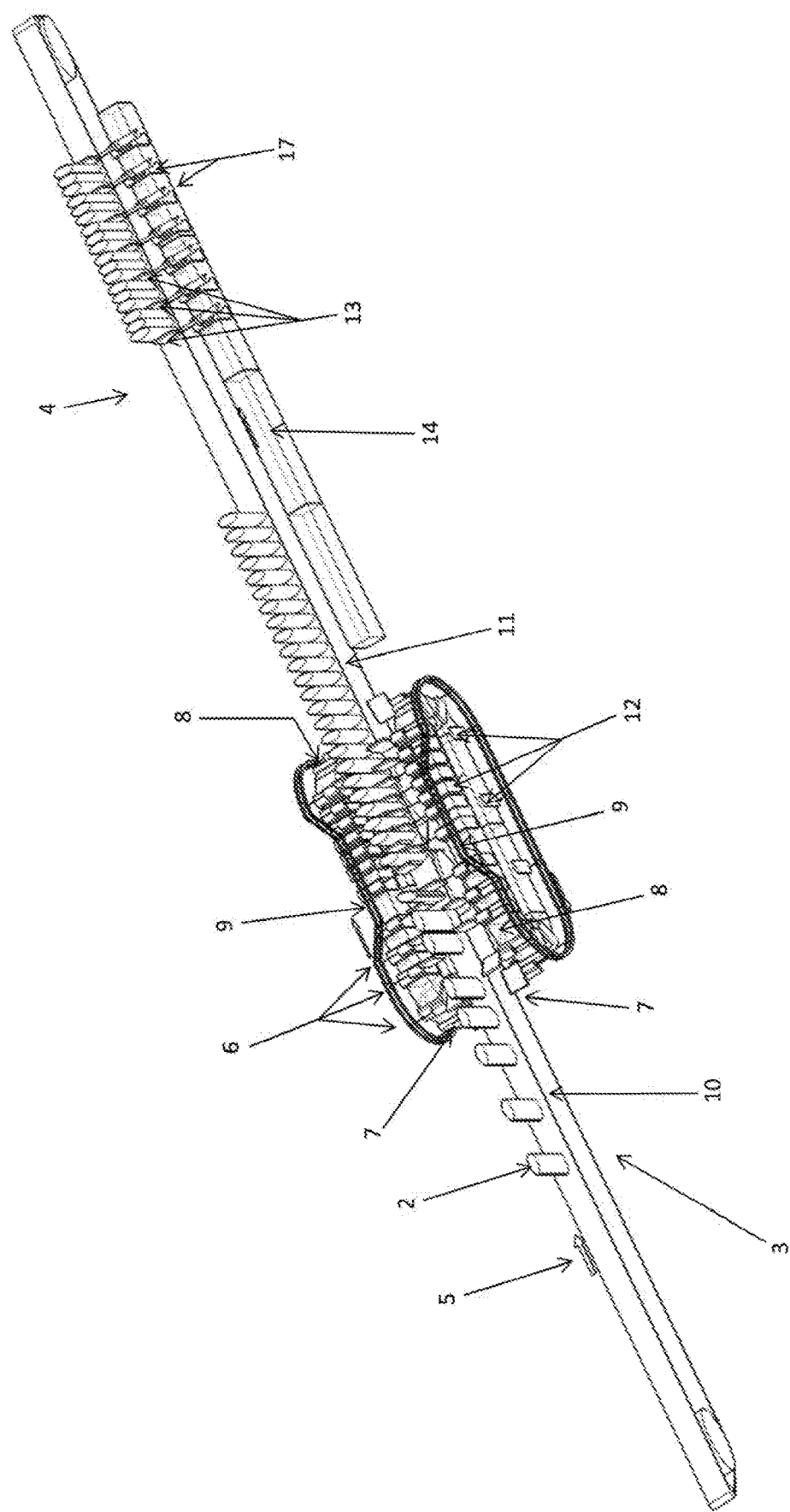
FIG. 1 shows a perspective view of an embodiment in which the products are oriented and then grouped by independent fingers.

The invention therefore has for its first subject matter a positioning device 1 for positioning products 2 while at the same time conveying them one after another on a conveying means 3 in a conveying plane 4 and along a conveying direction 5.

Figure 2:
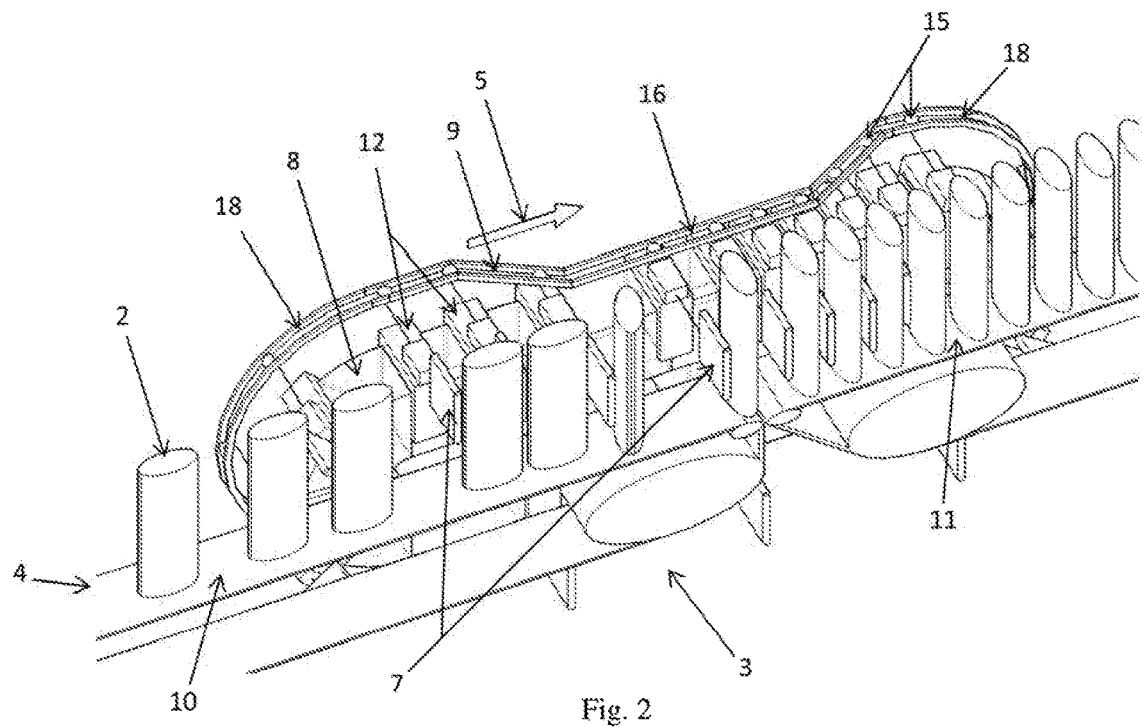
FIG. 2 shows a perspective view of the orientation part of the embodiment from FIG. 1. For improved visibility the elements disposed on the right of the conveying means looking in the conveying direction have been removed in this diagram.
Figure 3:
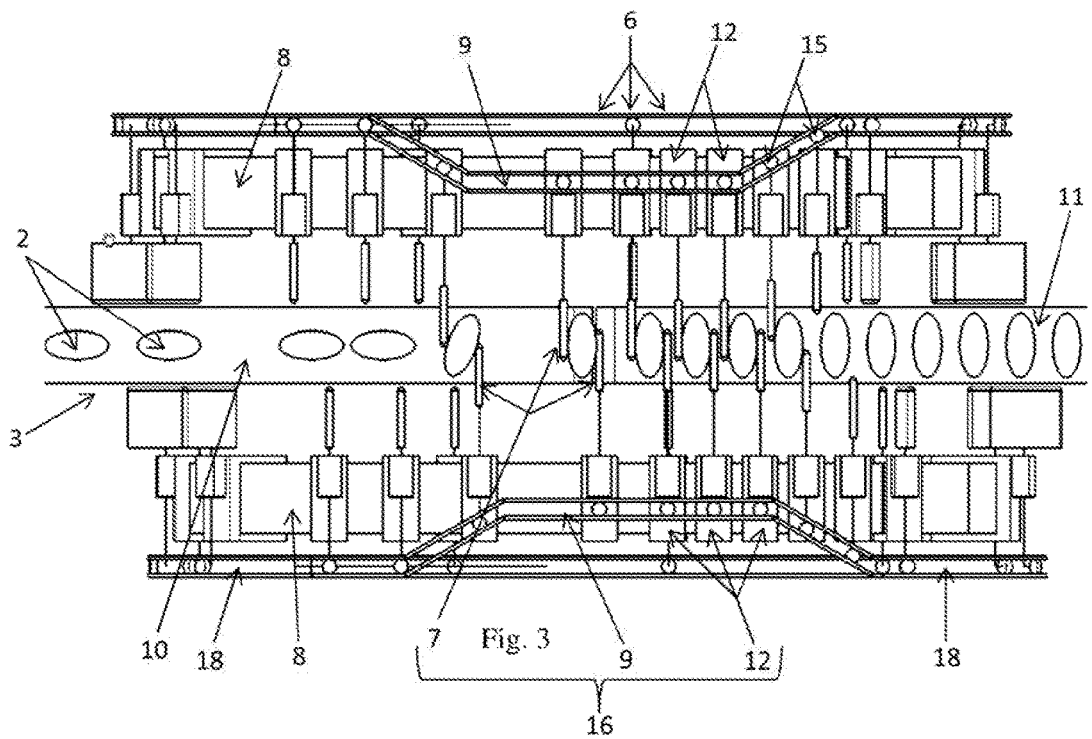
FIG. 3 shows a diagrammatic view from above in the conveying plane of the orientation part of the embodiment from FIG. 1.

The products 2 generally have a particular shape, as shown in FIGS. 1 to 3: the shape of the products is not a shape resulting from symmetry of revolution about a vertical axis. The products 2 are then small bottles or the like having for example a base of oblong shape, that is to say a shape longer than wide, preferably with rounded edges. The products 2 may equally have a base of some other, for example square or rectangular, shape. The base of the products 2 is preferably of oblong shape.

They are transported by the conveying means 3 one after another in a single file extending along the conveying direction 5. Before they are oriented with the aid of the device according to the invention, the products 2 are generally spaced from one another by a regular or irregular non-zero distance, that is to say two successive products 2 are not in contact. In the context of the present invention, there is meant by spacing (or distance) between two products 2 the distance that separates the upstream end of one product 2 from the downstream end of the product 2 following it. Before they are oriented with the aid of the device according to the invention, when the products 2 have a base the two dimensions of which are of different size, therefore not square, they are generally oriented longitudinally because of greater stability in that direction. In other words, as represented in FIGS. 1 to 4, the axis of symmetry of their base that corresponds to the greatest dimension of the shape, in particular the oblong shape, is parallel to the conveying direction 5.

The conveying means 3 generally correspond to a single conveyor or to a string of multiple conveyors one after another along the conveying direction 5. The one or more conveyors used in the present invention are in principle one or more chain, throughing belt, strip or belt conveyors that travel around at least two rollers situated at the upstream and downstream ends of the one or more conveyors. The conveying plane 4 extends on the upper surface of the conveying means 3 that supports the products 2. It is usually horizontal.

According to the invention, the positioning device 1 comprises a plurality of orientation means 6 each comprising at least one pusher 7 mounted to be mobile on a guide means 8, said guide means 8 being situated on the side of the conveying means 3 and defining a closed circulation loop at least a portion of which is located along the conveying direction 5, the at least one pusher 7 being adapted to act on a product 2 by pushing it to cause it to pivot through a predetermined angle about an axis perpendicular to the conveying plane 4, said orientation means 6 being capable of moving independently of one another on said guide means 8.

Each orientation means 6 is therefore intended to orient one product 2 at a time with the aid of at least one pusher 7. A pusher 7 of this kind is capable of moving along a guide means 8 that is disposed on the left or right side of the conveying means 3 when looking in the conveying direction 5. For its action on a product, a pusher 7 always travels in the same direction along the guide means 8, so that when it is acting on a product 2 it is moved from the upstream end of the positioning device 1 to the downstream end.

The guide means 8 defines a closed circulation loop, in particular of oblong shape. The circulation loop is preferably plane and in particular forms a plane parallel or perpendicular to the conveying plane 4. At least a portion of the guide means 8 extends along the conveying direction 5, in particular in the vicinity of the conveying means 3 and substantially at the height at which the products 2 travel. When the pusher 7 is located in this section, it is capable of acting on a product 2.

To cause a product 2 to pivot, it goes from an inactive position to an active position, effecting a movement in translation, in particular transversely to the conveying direction 5 and parallel to the conveying plane 4. In the inactive position a pusher 7 is too far away from the products 2 to be able to come into contact with them. On the other hand, in the active position a pusher 7 is able to come into contact with a product 2. In this position it then comes into contact with a product 2 and causes it to pivot by pushing it. Once oriented as required, the pusher 7 can return to its inactive position so as no longer to interact with the product 2. Throughout this action the pusher is moved on the guide means 8 along the conveying direction 5 in the conveying sense so as to cause the product 2 to pivot while it is moving.

The orientation means 6 are mobile independently of one another on said guide means 8. In other words, the relative position of the orientation means 6 on said guide means and therefore the distance between two different orientation means can be modified. This advantageously results in the ability of the positioning device 1 to cause products 2 fed at an irregular rate to pivot.

According to one possible additional feature, at least one cam 9 is provided on the side of the conveying means 3 along the conveying direction 5, said cam 9 being adapted to cause at least one pusher 7 to move to act on a product 2.

In other words, the cam 9 is able to cause the pushers 7 to go from their inactive position to their active position so as to act on a product 2, and vice-versa. To this end the pushers 7 may be mounted on the guide means 8 so as to be free to move in translation in a direction substantially transverse to the conveying direction 5 and substantially parallel to the conveying plane 4. Each pusher 7 may include a pin 15 (or roller) on its part mobile in translation, a pin 15 of this kind being sized to travel in a groove (or rail) serving as the cam 9. The cam 9 is then able to guide the pin 15 of a pusher 7 along a path causing the movement in translation of the pusher 7.

A cam 9 of this kind may for example follow a path parallel to that of the circulation loop of the guide means 8 and then execute a first step to move toward the conveying means 3. During this first step, the pushers 7 circulating on the guide means 8 go from the inactive to the active position. The cam 9 can then follow a path parallel to the conveying means 3 during which the pushers 7 remain in the active position, and then execute a second step to move away from the conveying means 3 again. During the second step, the pushers 7 return from the active position to the inactive position. In the remainder of the text the zone of the cam situated between the beginning of the first step and the end of the second step will be referred to as the action zone 16 of the cam 9. Of course, this action zone 16 is located at the level of a portion of the guide means 8 that extends along the conveying direction 5 so that the pushers 7 are able to act on the products 2. The first step of the action zone 16 is situated upstream of the second step in he conveying direction 5.

When the positioning device 1 includes a cam 9 of this kind the products 2 are oriented in a precise and fixed zone of the device, namely at the level of the action zone 16 of the cam 9. The pushers 7 each go from their inactive to active position and vice-versa at the same place in the device 1 but not simultaneously. These changes of position are effected successively for each pusher 7 in the order in which they pass.

Using a cam 9 of this kind to transmit a movement in translation to the pushers 7 advantageously makes it possible to dispense with a system necessitating complicated feeding in separate files because the pushers 7 travel in a closed loop.

Alternatively, the pushers 7 are driven by actuators to cause them to move from the inactive to the active position and vice-versa. In this case the products 2 are not necessarily oriented in a fixed zone of the device as the actuators can be actuated anywhere on a portion of the guide means 8 extending along the conveying means 3. Moreover, the actuators may be actuated simultaneously or not.

According to one possible additional feature each orientation means 6 comprises a pair of pushers 7 adapted to act together on a product 2, the two pushers 7 of the same orientation means 6 being mounted on respective guide means 8 each located on one side of the conveying means 3.

The positioning device 1 may therefore comprise two guide means 8 situated facing one another relative to the conveying means 3. In other words the device 1 includes a first guide means 8 located on one side of the conveying means 3 and a second guide means 8 located on the other side of the conveying means 3. Each orientation means 6 then includes a pusher 7 mounted on one guide means 8 and a pusher 7 mounted on the other guide means. The two pushers 7 of the same orientation means 6 are then substantially face to face. Thus half the pushers 7 are disposed on one side of the file of products 2 while the other half of the pushers 7 is disposed on the other side of the file of products 2. As the orientation means 6 are mobile independently of one another on each guide means 8, the pushers 7 are mobile independently of one another. The fact that the orientation means each have a pair of similar pushers 7 placed substantially face to face enables a symmetrical action to be effected on the products 2.

Alternatively, a product 2 may for example be rotated by the action of a single pusher 7 provided that a facing abutment is provided and slightly offset to obtain the required effect. In this case the orientation means 5 therefore includes only one pusher 6 and a facing abutment offset sufficiently to create a rotation.

The pivoting movement of a product 2 about an axis perpendicular to the conveying plane 4 is nevertheless preferably produced by the effect of two pushers 7 that are mobile and mounted facing one another. The orientation means 6 then includes a pair of pushers 7 that are slightly offset in the conveying direction 5 so that each acts on one side of the product 2 to create the expected pivoting movement thereof. Two pushers 7 opposed in this way then create parallel forces in opposite directions, preferably parallel to the conveying plane 4 and perpendicular to the conveying direction 5, able to have the effect of causing the product 2 to pivot about an axis perpendicular to the conveying plane 3.

An embodiment of this kind enables the product 2 not to move transversely to the conveying direction 5 when the pushers 7 are actuated. Generally speaking, whether the action on a product 2 is effected by means of one or more pushers 7, the principle is indeed to act on the product 2 by creating at least two forces the directions of which are not aligned and which together cause a movement comprising rotation about an axis perpendicular to the conveying plane 4. This enables a drive force to be exerted on the product 2 with at least a component parallel to the conveying plane 4 when it rests against an offset abutment that is either fixed or itself mobile. In embodiments that are advantageous because of their simplicity, each orientation means 6 comprises a pair of pushers 7 each intended to act from one side of the product 2 through a movement in translation perpendicular to the conveying direction 5 and parallel to the conveying plane 4.

When the pushers 7 are actuated with the aid of a cam 9 and the orientation means 6 each comprise a pair of pushers 7 the device comprises two cams 9 disposed on each side of the conveying means 5. The two pushers of the same orientation means must be slightly offset along the conveying direction 5 in order to be able to cause a product 2 to pivot. For this reason the action zones of the two cams 9 may be offset in the conveying direction 5, as represented in FIG. 3. They are generally offset by a distance such that the two pushers 7 of an orientation means 5 are actuated at the same time.

As indicated above the device 1 according to the invention may be adapted to process asymmetrical products 2, as shown in FIGS. 1 to 4. The length of a product 2 of this kind measured in the conveying direction 4 then changes as a function of its orientation and the action of the pushers 7 may then be impossible after a certain rotation angle if they cannot be fitted against the product 2.

According to one possible additional feature, the distance between the two pushers 7 of an orientation means 6 is therefore adjustable along the guide means 8 thanks to relative mobility of said pushers 7 on the guide means 8. This compensates the varying dimension of the product 2 following orientation of same by pivoting about an axis perpendicular to the conveying plane 4.

Generally speaking, each pusher 7 is mounted on a shuttle 12. The shuttles 12 cooperate with the guide means 8 and so the pushers 7 travel along the guide means 8. The pushers 7 are in principle mounted on the shuttles 12 by way of a sliding connection in a direction substantially transverse to the conveying direction 5. The pushers 7 are therefore capable of going from the inactive to the active position to cause the products 2 to pivot and vice-versa whilst circulating along the guide means 8.

According to one possible additional feature each pusher 7 is mounted on a shuttle 12 that travels on a guide means 8 by virtue of a magnetic linear motor principle.

The linear motor function is provided by the guide means 8, which is generally a rail. The fact that the shuttles 12 are driven with the aid of a magnetic linear motor advantageously makes it possible to dispense with a system necessitating complicated feeding in separate files because the pushers 7 travel in a closed loop.

Moreover, thanks to the use of the linear motor principle, the speed of each shuttle 12 is variable and the position of each shuttle 12 is individually controlled and known at all times. The shuttles 12 are mobile in a controlled and known manner which advantageously makes it possible to know accurately at all times the position of the product 2 when it is interacting with at least one pusher 7 carried by a shuttle 12. The shuttles 12 are therefore advantageously mobile relative to one another.

Alternatively, each pusher 7 is mounted on a shuttle 12 that travels on a guide means 8 thanks to a motor carried by each shuttle 12.

As indicated above, at the entry of the positioning device 1 the products 2 are spaced more or less regularly with their length generally extending along the conveying direction 5. The positioning device preferably causes the products 2 to rotate 90° about an axis perpendicular to the conveying plane 4. Once oriented, the products 2 are then generally oriented transversely to the conveying direction 5, that is to say with their width along the conveying direction 5. This results in an increase in the space in between the products 2 and therefore greater difficulty in grouping a plurality of products 2 together if required. This also results in increased instability of the products 2 because the greatest dimension of their base extends transversely to the conveying direction 5. This greater instability is felt more particularly when the products 2 undergo accelerations or decelerations if, for one reason or another, it is necessary to stop the conveying means 3 or to restart it for example.

It will therefore be clear that it is advantageous for the device 1 to be capable of modulating the spacing between the products 2 and to manage the problem of instability of the products 2 after they have been pivoted.

According to one possible additional feature, said conveying means 3 is therefore a succession of an upstream conveyor 10 and a downstream conveyor 11, the portion of said guide means 8 located along the conveying direction 5 extending along both the upstream and downstream conveyors 10, 11 and where applicable said cam 9 being on the side of the conveyors 10, 11.

The products 2 transported by the conveying means 3 are therefore transported successively by the upstream conveyor 10 and then by the downstream conveyor 11. The pushers 7 that travel on a guide means 8 are capable of acting on the products 2 when they are on the upstream conveyor 10 and when they are on the downstream conveyor 11. The products 2 are preferably pivoted when they are on the upstream conveyor 10. The second conveyor mainly enables adjustment of the spacing between the products 2.

Figure 4A:
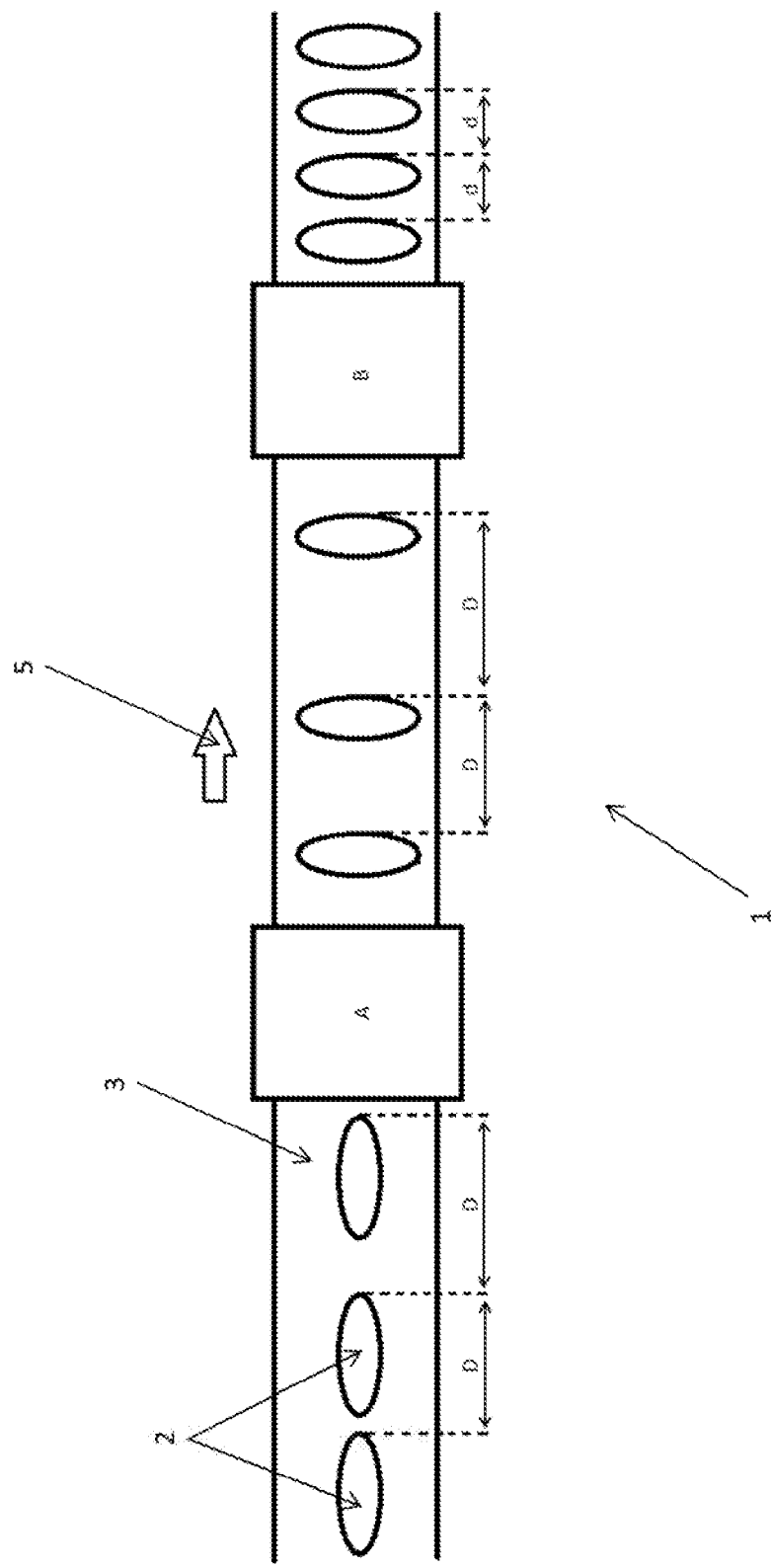
FIGS. 4a and 4b show a diagrammatic view from above in the conveying plane respectively representing:
the distance between the upstream end of two successive products, and
the distance between the upstream end of one product and the downstream end of the product following it, before orientation, after orientation, before spacing, and after spacing, in accordance with one embodiment of the invention.

Generally speaking, when the device 1 is operating the upstream conveyor 10 travels at a constant speed V1 and the downstream conveyor 11 travels at a variable speed V2. The speed V2 may be adjusted as a function of the flow of products 2 that are arriving so that the products 2 are spaced by a predefined fixed or variable distance. The speed V2 is preferably adjusted so that the products 2 are regularly spaced on the downstream conveyor 11. The speed V2 is generally less than the speed V1 in order to close up the products 2. The disposition in accordance with the invention therefore advantageously enables spacing of the products 2 by the required distance, that is to say converting a stream of products 2 spaced in an irregular manner into a stream of regularly spaced products 2. The device 1 more preferably closes up the products 2 and spaces them by a required distance. In other words, as shown in FIG. 4a, the variable distance D that separates the upstream end of two successive products 2 before they are oriented is reduced to a constant distance d during the passage over the downstream conveyor 11, the distance d being less than the distance D.

When the orientation means 6 each comprise a pair of pushers 7, the two guide means 8 of the device have a substantially rectilinear portion that extends along the conveying means 3 from the level of the upstream conveyor 10 to the level of the downstream conveyor 11. The same applies to the cam or cams 9 for actuating the pushers. To be more precise, when the device 1 according to the invention includes one or two cams 9 its or their action zone 16 extends along the side of the conveying means 3 along the upstream conveyor 10 and the downstream conveyor 11.

Whether the device 1 comprises cams 9 or not, after pivoting the products 2 the orientation means generally continue to be actuated to accompany the products 2 as far as the downstream conveyor 11 so as to ensure the stability of the products as they pass onto the downstream conveyor 11. To improve further the stability of the products 2 during the passage from one conveyor to the other the orientation means 6 preferably travel at the speed V2 when they accompany the products 2 on the conveyor 11. According to a preferred variant, when they arrive on the downstream conveyor 11 the distance that separates two successive products 2 corresponds to the width of two pushers 7. According to another preferred variant, when they arrive on the downstream conveyor 11 the distance that separates the upstream end of two successive products 2 corresponds to the width of a shuttle 12 that carries a pusher 7.

A device 1 provided with two conveyors 10, 11 of the above kind therefore proves advantageous on a number of counts. First of all, the speed V2 of the conveyor 11 may be reduced relative to the speed V1 of the conveyor 10 because the products 2 are oriented transversely to the conveying direction 5 on the conveyor V2. This results in a saving of time for stopping the conveyor 11 or restarting it without causing the products 2 to fall over because the corresponding deceleration or acceleration is lower compared to the upstream conveyor 10.

Moreover, the fact of being able to close up the products 2 by closing up the pushers 7 corresponding thereto and modifying the speed of the downstream conveyor 11 is particularly advantageous, above all when the pushers 7 are moved along the guide means 8 with the aid of a linear motor. In fact, in this case, the shuttles that support the pushers 7 are relatively wide, generally wider than the products 2. Accordingly, even by closing up the successive orientation means 6 as much as possible, it is not possible to move the products 2 closer together enough to regroup them in a satisfactory manner. The succession of two conveyors 10, 11 as described then makes it possible to close up the products 2 as much as possible with a view to facilitating subsequent grouping to maintain a good throughput. In this case, the distance that separates the upstream end of two successive products 2 corresponds approximately to the width of a shuttle 12 that carries a pusher 7.

The relative positioning of the orientation means 6 is preferably adapted to the position of the products 2 on the conveying means 3 so as to be able to synchronize the position of the orientation means 6 with the position of the products 2. In fact, the products 2 arrive one after the other with a more or less repeatable spacing within a certain range of accuracy. In extreme cases the products 2 may be spaced in a completely random manner without any form of repetition being identifiable. It is therefore preferable to identify the position of the products 2 and their mutual spacing before orienting them.

According to one possible additional feature, the device 1 therefore includes a means to provide information on the position of the products 2 mounted upstream of the orientation means 6 in the conveying direction 5 to identify the position of each product 2 to be oriented, together with a control unit to receive the signal from said information means and to condition the operation of the device, in particular by positioning the orientation means 6 substantially at the level of the products 2 to be caused to pivot, along the conveying direction 5. A means of this kind providing information on the position of the products is preferably a detection cell also known as a sensor or detector.

In some cases it may be desirable to assemble a predefined number of products 2 so that they are in contact with one another, for example with a view to boxing them.

According to one possible additional feature, the device therefore further includes at least two fingers 13 mounted on at least one guide 14 that extends at least in part along the conveyor means 3 downstream of said orientation means 6, said fingers 13 being mobile independently of one another along the at least one guide 14 and adapted to regroup a predetermined number of successive products 2 by closing them up so as to lie one against the other.

The device 1 preferably includes a single guide 14 disposed on one side of the conveying means 3. It may nevertheless include two guides 14 disposed on each side of the conveying means 3 along the conveying direction 5. In this case, it is immaterial whether the fingers 13 are mounted on one guide 14 or the other. In an identical manner to the pushers 7, the fingers 13 have an active position in which they are able to act on the products 2 and an inactive position in which they are not able to act on the products 2. Two fingers 13 are able to act when each is located at the opposite end of a succession of products 2 in order to group them. The two fingers 13 may then move toward each other so that the products 2 come into contact with one another.

The device 1 preferably includes more than two fingers 13 so as to be able to form a plurality of groups simultaneously. In this case, each finger 13 is mobile along at least on guide 14 independently of the others. Groups of products 2 can therefore be formed by placing a finger at the downstream end of the most downstream group to be formed, a finger at the upstream end of the most upstream group to be formed, and a finger 13 between each of the groups to separate them. A device 1 including n fingers 13 is therefore capable of forming n−1 groups of products 2 simultaneously.

When the conveying means is formed of an upstream conveyor 10 and a downstream conveyor 11 in succession the fingers 13 and therefore the guide or guides 14 are disposed at the level of the downstream conveyor 11.

According to one possible additional feature the at least one guide 14 is substantially rectilinear.

In this case, the fingers 13 are moved both ways in the conveying direction 5 to be able to form groups of products 2. Alternatively, the guide or guides 14 may define a closed circulation loop in a similar manner to the one or more guide means 8.

The fingers 13 are preferably driven by cylinders to cause them to move from the inactive position to the active position and vice-versa. In this case, the products 2 are not necessarily grouped in a fixed zone of the device 1, as it is possible to actuate the cylinders at any point of a portion of the guide 14 extending along the conveying means 3. Moreover, the cylinders may be actuated simultaneously or not. Alternatively, a cam similar to the cam 9 may be provided to actuate the fingers 13.

Generally speaking, each finger 13 is mounted on a carriage 17 that travels on a guide 14 in the same way that each pusher 7 is generally mounted on a shuttle 12 that travels on a guide means 8. Moreover, in a similar way to the shuttles 12, the carriages 17 may travel on a guide 14 thanks to a magnetic linear motor principle or thanks to a motor carried on each carriage 17.

The invention also consists in a method executed by this device 1, namely a method for positioning products 2 while at the same time conveying them one after another on a conveying means 3 in a conveying plane 4 and along a conveying direction 5.

This method is characterized in that the positioning of each product 2 comprises the following successive steps:
(i) defining the position of the product 2 on said conveying means 3;
(ii) positioning in a corresponding manner in the conveying direction 5 an orientation means 6 that travels on at least one guide means 8 that defines a closed circulation loop on the side of the conveying means 3; and
(iii) orienting the product 2 by moving at least one pusher 7 of the orientation means 6 to cause it to pivot through a predetermined angle about an axis perpendicular to the conveying plane 4.

The step (i) of defining the position of the products 2 may be executed with the aid of a means for producing information on the position of the products 2 placed upstream of the orientation means 6. This may in particular be a position sensor. A sensor of this kind may be coupled to a device for controlling the movement of the orientation means 6 along the one or more guide means 8 so that they are positioned so as to be able to act on the products 2.

During the step (ii) the orientation means 6 are therefore positioned to arrive at substantially the same level as the products 2 along the conveying direction 5 at the moment at which the pushers 7 go to the active position to cause the products 2 to pivot. The orientation means 6 may therefore be moved along the guide means 8 at a speed different from the speed of the conveying means 3. Moreover, the orientation means 6 travel independently of one another along the one or more guide means 8. That is to say that they may move closer together or farther apart and travel at different speeds. They are therefore capable of orienting products 2 spaced irregularly.

During the step (iii) the pushers 7 of the orientation means 6 are in their active position and come into contact with the products 2 to push them and cause them to pivot through an angle of 90° for example.

In some embodiments the pusher or pushers 7 of each orientation means 6 go(es) to the active position at different times. This is the case in particular if the change of position of the pusher or pushers is carried out because the device 1 includes a cam or cams. In this case the products 2 are oriented successively in the order in which they pass over the conveying means 3. In this case the orientation step always occurs at the same place in the device, that is to say in a zone that is immobile relative to the frame on which the conveying means 3 travel. To be more precise this may be the beginning of the action zone 16 of the cam or cams when it or they move(s) toward the conveying means 3 and therefore cause(s) the pusher(s) 7 of an orientation means 6 to move to the active position. According to one possible additional feature, the orientation step is therefore executed when the product 2 arrives in a predefined fixed zone.

When the position of the pushers is changed by cylinders, they may go to the active position to cause the products 2 to pivot at any time and anywhere in the conveyor means 3 provided that the guide means 8 extend(s) along the conveying means 3. The orientation step of the method can therefore take place at different places in the conveying means 3. A plurality of products 2 may be oriented simultaneously provided that the orientation means 6 are placed at substantially the same level as the products 2 to be oriented. However, when cylinders are used the products 2 may equally be oriented successively, for example in the order in which they pass on the conveying means 3, and the orientation step of the method may also take place when the products 2 arrive in a predefined fixed zone.

As indicated above, the conveying means 3 preferably comprise two successive conveyors, namely an upstream conveyor 10 and a downstream conveyor 11 that both extend along the conveying direction 5. In this case, the orientation step (iii) generally takes place on the upstream conveyor 10. Throughout the method, the upstream conveyor 10 travels at a feed speed V1 that is usually constant. On the other hand, the speed V2 of the downstream conveyor 11 may preferably vary during the method.

The method according to the invention may therefore further include a step (iv) after the orientation step (iii) during which the spacing between the products 2 may be modulated by adjusting the speed of the downstream conveyor 11 as a function of the spacing of the products 2 fed by the upstream conveyor 10. The pushers 7 are preferably always in the active position during this step and therefore accompany the products 2 as far as the downstream conveyor 11 so as to ensure their stability during the transfer of the products 2 from the upstream conveyor 10 to the downstream conveyor 11. The pushers 7 preferably travel at the speed V2 during this step.

The spacing of the products 2 may in particular be reduced after they have been oriented. In fact, the products 2 are generally oriented longitudinally before the orientation step (iii) and are then oriented transversely after that step. This results in an increase in their spacing. It is therefore desirable to close them up, in particular to facilitate subsequent grouping with a view to boxing them. For this reason the speed V2 is generally lower than the speed V1. The distance D that separates the upstream ends of two successive products 2 before the method is executed may therefore be reduced to a distance d during the step (iv) of the method.

The distance d is preferably constant and therefore corresponds to the pitch between the products 2 after the step (iv) of the method. The distance D may also be constant and then correspond to the pitch between the products 2 before the step (iv) of the method. In this case, the step (iv) corresponds to a reduction of the pitch between the products 2.

However, the products 2 are generally fed to the orientation means 6 with a spacing that is at least slightly irregular or even completely random. In this case, the distance D is not constant and the products 2 are not spaced as required before they are oriented. In this case, the step (iv) may consist in spacing the products 2 as required after they have been oriented. According to one possible additional feature, the method therefore further includes a step (iv) of spacing by the required distance after the orientation step (iii), during which:

the speed of a downstream conveyor 11 disposed in line with an upstream conveyor 10 is adjusted, said upstream conveyor 10 and said downstream conveyor 11 forming said conveying means 3, said adjustment being carried out continuously as a function of the stream of products 2 traveling on the upstream conveyor 10; and the at least one pusher 7 that causes a product 2 to pivot feeds it onto the downstream conveyor 11, the at least one pusher 7 then preferably traveling at the same speed as the downstream conveyor 11.

In some advantageous embodiments the products 2 may be formed into groups of products 2 comprising a predetermined number of products 2 preferably in contact with one another. The method may then include a grouping step (v), a step of this kind being carried out after the orientation step (iii). When the method includes a step (iv) of modulating the spacing between the products 2, preferably spacing them by the required distance, the grouping step (v) also takes place after that step (iv). The grouping step enables the groups of products 2 to be formed that are simultaneously boxed in a box and preferably form a row or a column of products 2 in a box.

When the passage from the inactive to active position and vice-versa of the pushers 7 is driven by cylinders and the pushers 7 are mounted on shuttles 12 carrying a motor to travel along the guide means, a step of the above kind may be carried out with the aid of the pushers 7. In fact, after the step (iii) and where applicable the step (iv) the two most upstream and most downstream pushers 7 of a group of products 2 to be assembled may remain in their active position while the other pushers placed between the products 2 of a group to be formed go to their inactive position. The two active pushers 7 that are at the two ends of the group of products 2 to be formed are then moved toward one another so that the products 2 that are located between these two pushers come into contact. By way of example, the most downstream active pusher 7 can slow down and/or the most upstream active pusher 17 can accelerate.

Whatever the means of actuating the pushers 7 and how they travel on the one or more guide means, the grouping step (v) may be carried out with the aid of fingers 13 disposed downstream of the orientation means 6. According to one possible additional feature, the method therefore further includes a grouping step (v) carried out after the orientation step (iii) and where applicable the spacing by the required distance step (iv), during which two fingers 13 mobile independently of each other along the conveying direction 5 group a predetermined number of successive products 2 by closing them up against one another.

To form a group of products 2 a first finger 13 goes to the active position, that is to say is able to come into contact with products 2, and is placed between the most downstream product 2 of the group to be formed and the product 2 directly downstream thereof. A second finger 13 goes to the active position and is placed between the most upstream product 2 of the group to be formed and the product 2 directly upstream thereof. The two fingers 13 are then moved toward each other to space by the required distance the products 2 situated between these two fingers against one another. For example, the most downstream finger 13 may slow down and/or the most upstream finger 13 may accelerate.

In the same manner, a plurality of groups of products 2 may be formed simultaneously by placing a finger 13 upstream of the most upstream product 2 to be grouped, a finger 13 downstream of the most downstream product 2 to be grouped, and a finger 13 between each group of products 2 to be formed. The grouping step (v) then consists in moving toward each other the two fingers 13 situated at the upstream and downstream ends of the set of products 2 to be grouped.

Generally speaking, the fingers 13 are mobile independently of one another along a guide 14. They can therefore travel at a variable speed which may be different from that of the conveying means 3. They can travel along the conveying direction 5, generally both in the same direction as the conveying means 3 and in the opposite direction.

In the embodiment shown in FIGS. 1 to 3 the positioning device 1 includes a conveying means 3 consisting in an upstream conveyor 10 and a downstream conveyor 11 mounted in succession one after the other. These two conveyors 10, 11 are endless conveyors and extend in the same substantially horizontal conveying plane 3 along a conveying direction 5.

As shown in FIGS. 1 and 3 this device 1 may include two guide means 8 each of which defines a closed loop extending in a substantially vertical plane, that is to say a plane perpendicular to the conveying plane 3. The two guide means 8 face each other and are disposed on respective opposite sides of the conveying means 3. These two guide means 8 are preferably rails. Both include a substantially linear portion that extends along the conveying means 3, more or less at the height of the products 2 that are transported by the conveying means 3. It is in this portion that the pushers 7 are able to act on the products 2 by coming into contact with them when they are in the active position. This portion of the guide means 8 extends both along the upstream conveyor 10 and along the conveyor 11.

In the embodiment represented in FIGS. 1 to 3 the positioning device 1 includes a plurality of orientation means 6 each including a pair of pushers 7. The two pushers 7 of the same orientation means are placed substantially face to face, slightly offset along the conveying direction 5, so as to act together on a product 2. Each guide means 8 therefore supports one of the pushers 7 of the same orientation means 6. Each orientation means 6 may be moved along the guide means 8 independently of the others. The relative distance between two orientation means 6 is therefore liable to vary. Consequently, the pushers 7 traveling on the same guide means 8 may also be moved independently of one another. Two pushers 7 of the same orientation means 6 are preferably also able to be moved one relative to the other to take account of the potential difference in size between the two dimensions of the base of the products 2.

The pushers 7 from FIGS. 1 to 3 are carried by shuttles 12 that preferably travel along the guide means 8 with the aid of a magnetic linear motor. However, the shuttles 12 may travel with the aid of motors carried by each of the shuttles 12. The pushers 7 are mounted on the shuttles 12 so as to be mobile in translation along a direction perpendicular to the conveying direction 5 and parallel to the conveying plane 4.

Because of this mobility in translation, the pushers 7 may be in the inactive position in which they are at the sides of the file of products 2 and are not able to come into contact with the products 2 or in the active position in which they are able to come into contact with the products 2. When they go to the active position they execute a movement in translation along a direction perpendicular to the conveying direction 5, parallel to the conveying plane 4 and toward the guide means 8 on which they are not mounted. The two pushers 6 of a pair are therefore able to move toward each other transversely to the conveying direction 5 when they go to the active position and then to move away from each other transversely to the conveying direction 5 when they go to the inactive position.

In FIGS. 1 to 3 the change of position of the pushers is performed with the aid of a cam 9 disposed in the vicinity of each guide means 8 and pins 15 disposed on the pushers 7. The cams 9 are a sort of groove in which the pins 15 of the pushers$^9$ travel. Each cam 9 has an inactive zone 18 that substantially follows the path of the guide means 8. The pushers 7 the pins 15 of which are in this zone are in the inactive position.

As represented in detail in FIGS. 2 and 3, each cam also has an action zone in which the pushers 7 are able to act on the products 2. This zone may be situated at the level of the substantially rectilinear portion of the guide means 8 that extends along the conveying means 3 substantially at the height of the products 2. The action zone 16 may extend from the level of the upstream conveyor 10 to the level of the downstream conveyor. When the device 1 is provided with two cams 9 disposed face to face as represented in FIGS. 1 and 3 the action zone 16 of one cam 9 may be slightly offset relative to the action zone 16 of the other cam 9 along the conveying direction 5. The two pushers 7 of the same pair therefore go from their inactive to their active position (and vice-versa) at the same time to effect a symmetrical action on a product 2.

The action zone 16 may include an upstream part that is a zone approaching the conveying means 3, a substantially rectilinear central part parallel to the conveying means 3, and a downstream part in which the cam 9 is moved away from the conveying means 3 to rejoin the inactive zone 18 of the cam. In the upstream part the pushers 7 go from the inactive to active position and are able to push the products 2 to cause them to pivot. In the central part the pushers 7 remain active and are able to modulate the spacing between the products 2 and in particular to reduce the distance between the upstream end of two successive products 2. In the downstream part the pushers 7 go from the active position to the inactive position. The upstream part of the action zone 16 preferably extends along the upstream conveyor 10. The central part preferably extends along the upstream conveyor 10 and the downstream conveyor 11 and the downstream part of the action zone 16 preferably extends along the downstream conveyor 11.

The positioning device 1 may further include at least one sensor disposed upstream of the orientation means 6 and intended to define the position of the products 2 on the conveying means 3, in particular on the upstream conveyor 10. It may equally include a control module that receives the positions of the products 2 and controls the movement of the orientation means 6 accordingly to cause the products 2 to pivot and where applicable controls the speed of the downstream conveyor 11 and the displacement as well as the actuation of the fingers 13.

As represented in FIG. 1, the positioning device 1 may further include downstream of the guide means 8 and therefore the orientation means 6 and fingers 13 intended to group a plurality of products 2 together ahead of a take-up zone in which the products 2 of the same group are boxed simultaneously. Each finger 13 may be mounted on a carriage 17 that travels along a guide 14. The guide 14 may in particular be substantially rectilinear and extend along the conveying means 3, in particular along the downstream conveyor 11. The fingers 13 can therefore be mounted side by side along the guide 14. Just like the shuttles 12, the carriages 17 preferably travel on the guide 14 with the aid of a magnetic linear motor but may also travel with the aid of on-board motors.

Just like the pushers 7, the fingers 13 are mounted to be mobile in translation along a direction transverse to the conveying direction 5 and parallel to the conveying plane 4 so as to be able to act on the products 2. The fingers 13 may therefore be in the active position as shown in FIG. 1, that is to say able to come into contact with the products 2, or in the inactive position. When the fingers 13 are in the inactive position they are disposed to the side of the file of products 2 but at a certain distance so that they cannot come into contact with them. They are then moved in translation in a direction transverse to the conveying direction 5, parallel to the conveying plane 4 and toward the products 2 so as to be able to group a predefined number of products 2 with one another. As represented in FIG. 1, the position of the fingers 13 may be changed with the aid of a cylinder disposed on each finger 13.

The fingers 13 are mobile independently of one another along the conveying direction 5 and are able to travel in the same direction as the conveying means 3 or in the opposite direction. When they are in the active position two fingers 13 disposed at the level of the upstream and downstream ends of a succession of products 2 to be grouped can therefore move toward each other so as to group together a plurality of products 2. A plurality of groups can be formed simultaneously by inserting a finger 13 in the active position at the upstream and downstream ends of the file of products 2 to be grouped into a plurality of groups and inserting a finger 13 in the active position between each of the groups 2 of products to be formed. The fingers 13 located at the two ends of the file are then moved toward each other. By way of example, FIG. 1 represents the formation of six groups each of three products 2.

One possible method of using a device 1 as represented in FIGS. 1 to 4 will now be described.

Throughout the method the products 2 travel in Indian file along the conveying means 3. They may be of oblong shape as represented in FIGS. 1 to 4 but may equally be some other shape, such as square or rectangular for example. Before being treated by the device 1 they preferably travel with their longest dimension along the conveying direction 5, that is to say longitudinally.

Figure 4B:
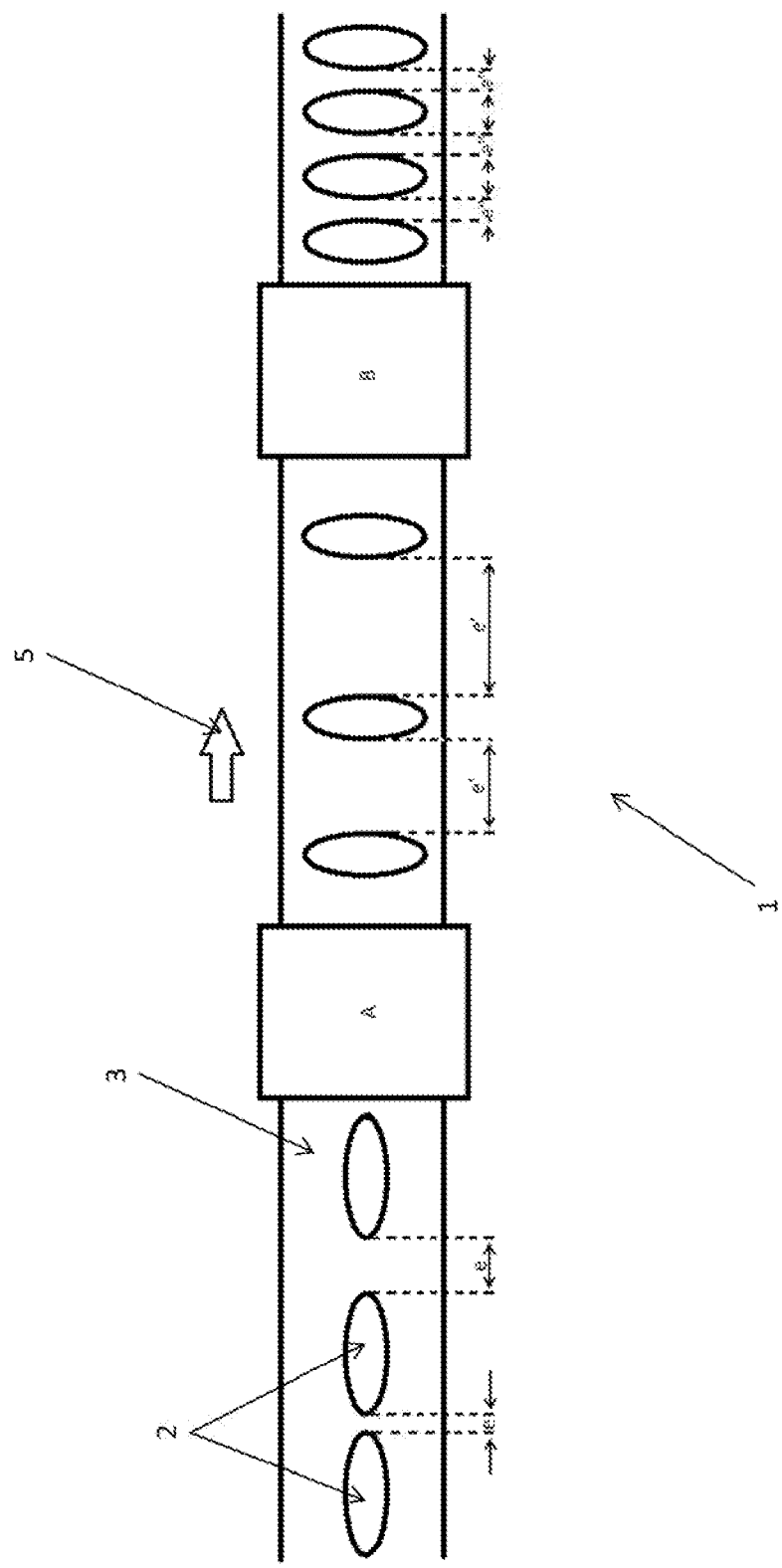

As represented in FIGS. 1 to 4, and in particular in FIGS. 4a and 4b, the products 2 can be fed to the orientation means 6 spaced by a distance e that may be different between successive products 2. In this case the distance D that separates the upstream end of two successive products 2 is no longer regular between the successive products 2. That is to say, before being treated by the device 1 the products 2 are not necessarily spaced by the required distance.

The step (i) of determining the position of the products 2 may be carried out first: the position of the products 2 on the conveying means 3, in particular on the upstream conveyor 10, may be identified with the aid of at least one sensor disposed upstream of the orientation means 6.

There follows the step (ii) of positioning the orientation means 6: the pushers 7 may then be positioned on their guide means 8 so that they may be at substantially the same level along the conveying direction 5 as the products 2 to be oriented when they arrive at the beginning of the action zone of the cam 9. The orientation means 6 are therefore successively oriented as the products 2 travel on the conveying means 3. The two pushers 7 of the same orientation means 6 are positioned at substantially the same time. The orientation means 6 are therefore synchronized with the products 2 so as to be able afterwards to cause them to pivot.

The next step is generally the orientation step (iii) during which the two pushers 7 of the same orientation means 6 go substantially simultaneously from their inactive position to their active position, that is to say are moved toward one another in the direction transverse to the conveying direction 5. Whilst going from their inactive to their active position, they continue to advance along the conveying direction 5, preferably at a speed substantially equal to the speed of the conveying means 3, in particular at the speed V1 of the upstream conveyor 10. The two pushers 7 of an orientation means 6 therefore push a product 2 whilst causing it to pivot about an axis perpendicular to the conveying plane 4, notably through an angle of 90°. During this step (iii) the two pushers 7 may be moved toward each other along the conveying direction 5 in order to manage the potential difference in length between the two dimensions of the base of the product 2 on which they are acting.

In FIGS. 4a and 4b these first three steps are symbolized by the block A. After the step (iii) the products 2 may therefore be disposed transversely along the conveying means 3. The distance D that separates the upstream ends of two successive products 2 has not changed during these three steps. On the other hand, because the products 2 may have the two dimensions of their base of different size, the spacing e has been modified, in particular lengthened, to reach a length e'.

As represented in FIGS. 1 to 3, the first three steps of the method generally take place at the level of the upstream conveyor 10. That conveyor travels at a speed V1 that is in principle constant over time. As represented in FIGS. 1 to 4 the method may equally include a step (iv) of spacing the products 2 at the required distance. This step in principle takes place when the products 2 go from the upstream conveyor 10 to the downstream conveyor 11. To this end the speed of the downstream conveyor 11 is synchronized with the spacing of the products 2 just after they are oriented so that the products 2 arrive on the conveyor 11 regularly spaced by a distance e″ preferably less than the distance e′. The speed V2 of the conveyor 11 is therefore variable and preferably less than the speed V1 of the upstream conveyor 10. Moreover, in order to ensure the stability of the products 2 during this spacing step (iv) the pushers 7 remain in their active position so that each pair of pushers 7 fits closely around a product 2 and travels at the same speed V2 as the downstream conveyor 11. Once the products 2 are on the downstream conveyor 11 the pushers 7 return to the inactive position.

In FIGS. 4a and 4b this spacing step (iv) is represented by the block B. After this step the products 2 are regularly spaced by an identical distance e" between each product 2 that is preferably less than the distance e' that may vary from one product 2 to another. After this step the products 2 are disposed on the downstream conveyor 11 with a pitch d that is generally less than the distance D.

As represented in FIG. 1, the method may equally include a step (v) of grouping products 2. A step of this kind may in particular follow the step (iv). During this step one or more groups of products 2 may be formed.

In FIG. 1 six groups each of three products 2 are formed simultaneously. To this end seven fingers 13 are placed as follows:
- the most downstream finger 13 is positioned downstream of the most downstream product 2 to be grouped,
- the most upstream finger 13 is positioned upstream of the most upstream product 2 to be grouped, and
- the other five fingers are positioned between each of the groups to be formed.

Once positioned, the fingers 13 generally travel at the same speed as the downstream conveyor 11 and are placed in their active position whilst moving in translation along the direction transverse to the conveying direction 5 and parallel to the conveying plane 4. The two fingers 13 located at the upstream and downstream ends of the set of products to be grouped are then closed up along the conveying direction 5 so that the products 2 of the same group are in contact with one another.

As indicated above, in some embodiments the device 1 may include two distinct guide means 8 each disposed on one side of the conveying means 3 to face one another and orientation means 6 each including a pair of pushers 7 with, in each pair, one pusher 7 mounted on one guide means 8 and the other pusher 7 mounted on the other guide means.

According to a variant of these embodiments described in detail above and represented in the appended FIGS. 1 to 3, the device 1 may include two cams 9 each disposed on one side of the conveying means 3 to face each other, one of the cams 9 being adapted to drive the movement of one of the pushers 7 of each orientation means 6 and the other cam 9 being able to drive the movement of the other pusher 7 of each orientation means 6. In other words each cam 9 is intended to drive the movement of the pushers mounted on one or the other of the drive means 8 in order to act on the products 2.

Figure 5:
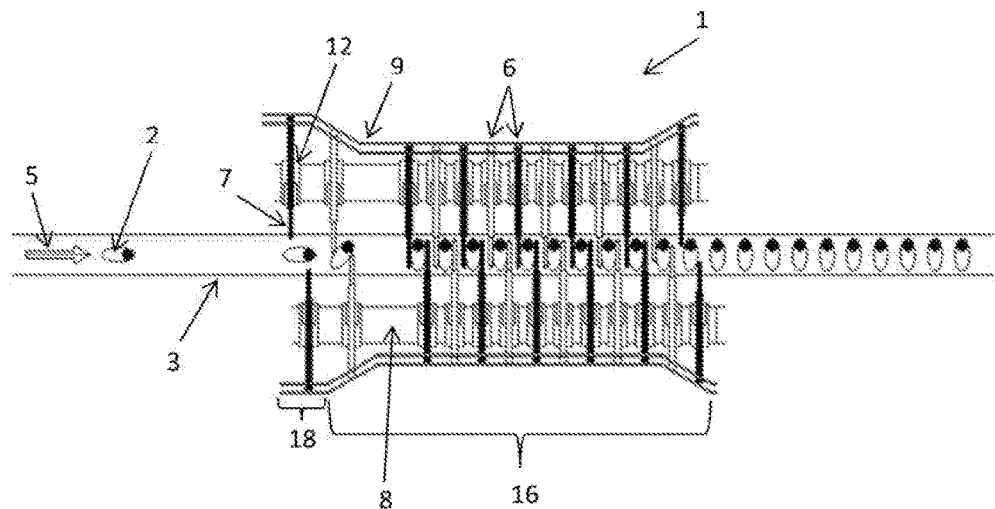
FIG. 5 shows a diagrammatic view from above of another embodiment in which the products have been oriented.
Figure 6:
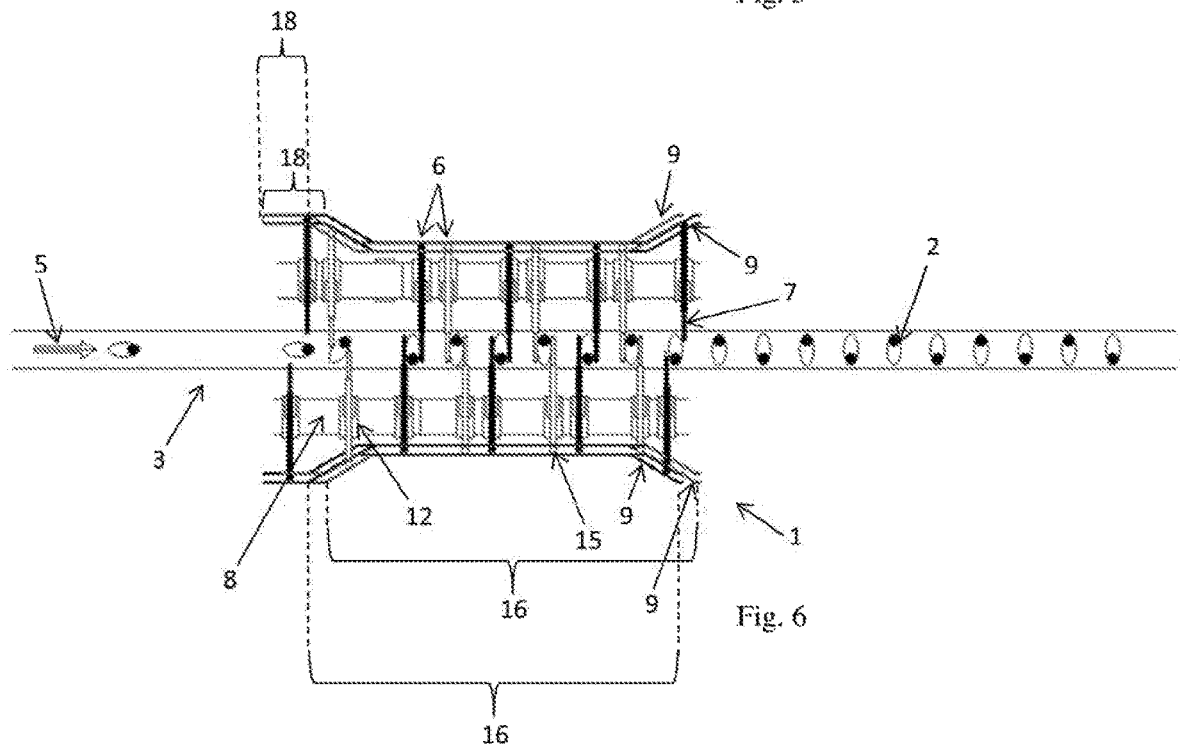
FIG. 6 shows a diagrammatic view from above of a further embodiment in which the products have been oriented.

According to another variant of these embodiments represented in the appended FIGS. 5 and 6, the device 1 may include on each side of the conveying means 3 two cams 9 as described above, that is to say four cams 9 in total. These cams 9 are generally substantially identical, in particular in terms of dimensions. In the remainder of the text, to promote understanding, the two cams 9 disposed on the same side of the conveying means 3 may be termed "pair of cams 9" or "first and second cam 9".

Each pusher 7 mounted on the same guide means 8 may then be fastened to one or the other of the cams 9 situated on the same side of the conveying means 3 as said guide means 8. Thus two distinct cams 9 are used to manage the movement to the active position and reciprocal movement to the inactive position of the set of pushers 7 mounted on the same guide means 8.

A device of this kind is particularly advantageous in that depending on how the cams 9 of the same pair are positioned it is possible to modulate the direction of rotation of the products 2 about an axis perpendicular to the conveying plane 4. Thus some products 2 may undergo rotation in the clockwise direction while others may undergo an anticlockwise rotation. This is particularly beneficial when the products 2 concerned have a base with no axis of symmetry perpendicular to the greatest dimension of the base. For example, these may be products with a triangular base. To optimize space it may therefore be beneficial for these products 2 not to be all pivoted in the same direction with a view to packaging them in batches, for example boxing them.

As represented in the appended FIGS. 5 and 6 the pushers 7 mounted on the same guide means 8 are preferably alternately fastened to one or the other of the pair of cams 9 located on the same side as that guide means. In the same guide means 9, if one pusher 7 is fastened to a first cam 9, the pusher directly following it will therefore be fastened to the second cam, and so on. A configuration of this kind can enable positioning the products 2 in an anti-parallel configuration, two consecutive products 2 along the conveying direction being liable to undergo rotations in opposite directions.

In principle the two cams 9 of the same pair are positioned one above the other in a superposed manner (that is to say that as seen from above only the top cam 9 can be seen) or then offset along the conveying direction 5 whilst being aligned perpendicularly to that direction 5. It will therefore be clear that when the two cams 9 of a pair are superposed all the products 2 undergo a rotation that will be in the same direction. On the other hand, when they are offset, some products 2 are pivoted in the clockwise direction while others are pivoted in the anticlockwise direction, the rotation direction being determined by the cams 9 to which the orientation means 6 that act on the products 2 are connected.

At least one cam 9 of each pair of cams 9 is preferably mounted to be mobile along the conveying direction 5. The same device 1 can therefore advantageously be able, by simple adjustment, either to cause all of the products 2 to pivot in the same direction or to cause some products 2, preferably one product 2 in two in the order of movement of the products 2, to be pivoted in one direction and the others in the other direction. This results in a particularly versatile device that enables easy modification of the positioning of the products 2 during a change of format for example.

Thus FIG. 5 represents a device 1 according to a configuration in which the cams 9 of each pair are superposed and in which on each side of the conveying means 3 the pushers 7 are alternately fastened via a pin 15 (which may also be termed a cam roller) to one or the other of the cams 9 disposed on the same side of the conveying means 3 as the guide means 8 that carries them.

To make the figure easier to understand, in each pair of cams 9 the pushers 7 fastened to a cam 9 are represented in black while the pushers 7 fastened to the other cam 9 are represented in white. For the same reasons, the products 2 include a zone colored black at one of their ends in order easily to identify the direction in which they pivot.

In FIG. 5, as the two cams 9 of each pair are superposed, the orientation means 6 act in the same manner on each of the products 2. To be more precise, in each orientation means the top pusher 7 in the figure is upstream of the bottom pusher 7 in the figure along the conveying direction. The top pusher 7 therefore acts systematically at the level of the upstream part of a product 2, pushing it down, while the bottom pusher 7 acts systematically at the level of the downstream part of a product 2, pushing it up. This results in a rotation in the anticlockwise direction.

FIG. 6 is similar to FIG. 5 except that the two cams 9 of each pair are offset along the conveying direction. The device from FIG. 6 is advantageously the same as that from FIG. 5 in which a cam of each pair has been moved in translation along the conveying direction to enable an antiparallel orientation of the products 2.

In this figure, as the two cams 9 of each pair, in particular, their action zones 16, are offset along the conveying direction 5 the orientation means 6 act in two different manners.

The orientation means 6 the pushers 7 of which are white in FIG. 6 act in the same manner as all of the orientation means 6 from FIG. 5 and therefore generate a rotation in the anticlockwise direction of the products 2 on which they act.

On the other hand, the orientation means 6 the pushers 7 of which are black in FIG. 6 act in the following manner. In each of these orientation means 6 the top pusher 7 in the figure is downstream of the bottom pusher 7 in the figure along the conveying direction 5. The top pusher 7 therefore acts at the level of the downstream part of a product 2, pushing it down, while the bottom pusher 7 act systematically at the level of the upstream part of a product 2, pushing it up. This results in a rotation in the clockwise direction.

To this end:
- the top cam 9 with which the black pushers 7 are associated is offset downstream relative to the other top cam 9 along the conveying direction 5, and
- the bottom cam 9 with which the black pushers 7 are associated is offset upstream relative to the other bottom cam 9 along the conveying direction 5.

The products 2 are therefore alternately oriented in the clockwise and anticlockwise direction as they move on the conveying means 3. This results in an anti-parallel arrangement of the products 2.

Thanks to the invention, it is therefore possible to cause the products to pivot while they are being conveyed about an axis perpendicular to the conveying plane, whether those products arrive regularly spaced or not. Thanks to the orientation means that travel in a closed loop, the products may be rotated at a good rate and in particular without degrading the products.

Moreover, in some embodiments the invention enables the transportation speed of the products to be slowed down whilst maintaining the throughput by reducing the distance that separates the upstream end of two successive products after rotation thereof. This results in improved stability of the products and a possibility of stopping and restarting the conveyor that transports the product more rapidly. This also results in facilitated grouping of the products.

In some embodiments the invention also enables the products to be spaced at the required distance and/or groups of a predefined number of products to be formed.

Although the above description is based on particular embodiments it is in no way limiting on the scope of the invention and modifications may be made, in particular by substitution of technical equivalents or by a different combination of some or all of the features described hereinabove.

The invention claimed is:

1. A positioning device (1) for positioning products (2) while at the same time conveying products one after another on a conveyor (3) in a conveying plane (4) and along a conveying direction (5), the device (1) comprising:
    a plurality of orientation devices (6) each comprising at least one pusher (7) mounted with the ability to move on a guide (8), said guide (8) being situated on a side of the conveyor (3) and defining a closed circulation loop at least a portion of which lies along the conveying direction (5), the at least one pusher (7) being able to act on a product (2) by pushing it in order to cause it to pivot through a predetermined angle about an axis perpendicular to the conveying plane (4), said orientation devices (6) each configured to move independently, in a longitudinal direction, of one another on said guide (8).

2. The device as claimed in claim 1, wherein at least one cam (9) is provided on the side of the conveyor (3) along the conveying direction (5), said cam (9) being adapted to cause the movement of at least one pusher (7) to act on a product (2).

3. The device as claimed in claim 1, wherein said conveyor (3) consists of in succession an upstream conveyor (10) and a downstream conveyor (11), the portion of said guide (8) located along the conveying direction (5) extending along the length of both the upstream and downstream conveyors (10, 11) and where applicable said cam (9) being at the side of the conveyors (10, 11).

4. The device as claimed in claim 1, wherein each orientation device (6) includes a pair of pushers (7) adapted to act together on a product (2), the two pushers (7) of the same orientation device (6) being mounted on respective guide (8) each located on one side of the conveyor (3).

5. The device as claimed in claim 4, wherein the distance between the two pushers (7) of an orientation device (6) is adjustable along the guide (8) thanks to relative mobility of said pushers (7) on the guide (8).

6. The device as claimed in claim 1, wherein each pusher (7) is mounted on a shuttle (12) that travels on a guide (8) thanks to a magnetic linear motor principle.

7. The device as claimed in claim 2, wherein said conveyor (3) consists of in succession an upstream conveyor (10) and a downstream conveyor (11), the portion of said guide (8) located along the conveying direction (5) extending along the length of both the upstream and downstream conveyors (10, 11) and where applicable said cam (9) being at the side of the conveyors (10, 11).

8. The device as claimed in claim 1, further comprising at least two fingers (13) mounted on at least one guide (14) that extends at least in part along the conveyor (3) downstream of said orientation devices (6), said fingers (13) being mobile independently of one another along the at least one guide (14) and adapted to group a predetermined number of successive products (2) by closing them up against one another.

9. The device as claimed in claim 8, wherein said at least one guide (14) is substantially rectilinear.

10. The device as claimed in claim 2, wherein each orientation device (6) includes a pair of pushers (7) adapted to act together on a product (2), the two pushers (7) of the same orientation device (6) being mounted on respective guide (8) each located on one side of the conveyor (3).

11. The device as claimed in claim 3, wherein each orientation device (6) includes a pair of pushers (7) adapted to act together on a product (2), the two pushers (7) of the same orientation device (6) being mounted on respective guide (8) each located on one side of the conveyor (3).

12. The device as claimed in claim 2, wherein each pusher (7) is mounted on a shuttle (12) that travels on a guide (8) thanks to a magnetic linear motor principle.

13. The device as claimed in claim 3, wherein each pusher (7) is mounted on a shuttle (12) that travels on a guide (8) thanks to a magnetic linear motor principle.

14. A method for positioning products (2) while at the same time conveying them one after another on a conveyor (3) in a conveying plane (4) and along a conveying direction (5), the method comprising:
    (i) defining the position of the product (2) on said conveyor (3);

(ii) positioning, in a corresponding manner in a longitudinal direction in the conveying direction (5), an orientation device (6) configured to move independently and that travels on at least one guide (8) that defines a closed circulation loop on a side of the conveyor (3); and (iii) orienting the product (2) by moving at least one pusher (7) of the orientation device (6) to cause it to pivot through a predetermined angle about an axis perpendicular to the conveying plane (4).

15. The method as claimed in claim 14, further comprising a step (iv) of spacing at the required distance after the orientation step (iii), wherein:

the speed of a downstream conveyor (11) disposed in line with an upstream conveyor (10) is adjusted, said upstream conveyor (10) and said downstream conveyor (11) forming said conveyor (3), said adjustment being carried out continuously as a function of the stream of products (2) traveling on the upstream conveyor (10); and the at least one pusher (7) that causes a product (2) to pivot feeds it as far as the downstream conveyor (11), the at least one pusher (7) then preferably traveling at the same speed as the downstream conveyor (11).

16. The method as claimed in claim 14, wherein the orientation step is carried out when the product (2) arrives in a predefined fixed zone.

17. The method as claimed in claim 14, further comprising a grouping step (v) carried out after the orientation step (iii) and where applicable the spacing to the required distance step (iv), during which two fingers (13) move independent of one another along the conveying direction (5) to group a predetermined number of successive products (2) by closing them up against one another.

18. The method as claimed in claim 15, wherein the orientation step is carried out when the product (2) arrives in a predefined fixed zone.

19. The method as claimed in claim 15, further comprising a grouping step (v) carried out after the orientation step (iii) and where applicable the spacing to the required distance step (iv), during which two fingers (13) move independent of one another along the conveying direction (5) to group a predetermined number of successive products (2) by closing them up against one another.

20. The method as claimed in claim 16, further comprising a grouping step (v) carried out after the orientation step (iii) and where applicable the spacing to the required distance step (iv), during which two fingers (13) move independent of one another along the conveying direction (5) to group a predetermined number of successive products (2) by closing them up against one another.

\* \* \* \* \*